(12) United States Patent
Lee et al.

(10) Patent No.: US 10,866,843 B2
(45) Date of Patent: Dec. 15, 2020

(54) METHOD AND SYSTEM FOR INVOKING EVENT-BASED PACKAGE MODULE

(71) Applicant: NHN Entertainment Corporation, Seongnam-si (KR)

(72) Inventors: Hyeon Geol Lee, Seongnam-si (KR); Ji Seong Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 16 days.

(21) Appl. No.: 16/038,178

(22) Filed: Jul. 18, 2018

(65) Prior Publication Data

US 2019/0026164 A1    Jan. 24, 2019

(30) Foreign Application Priority Data

Jul. 19, 2017   (KR) .......... 10-2017-0091705
Jul. 19, 2017   (KR) .......... 10-2017-0091709

(51) Int. Cl.

| | |
|---|---|
| *G06F 9/54* | (2006.01) |
| *G06F 9/445* | (2018.01) |
| *G06F 8/65* | (2018.01) |
| *G06F 8/75* | (2018.01) |
| *H04L 29/06* | (2006.01) |

(52) U.S. Cl.
CPC .............. *G06F 9/542* (2013.01); *G06F 8/65* (2013.01); *G06F 8/75* (2013.01); *G06F 9/445* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,415,434 | B1* | 7/2002 | Kind ................. | G06F 9/449 717/107 |
| 6,484,214 | B1* | 11/2002 | Sundermier ......... | G06F 8/36 717/165 |
| 2002/0004424 | A1* | 1/2002 | Nelson ............... | G07F 17/32 463/42 |
| 2004/0078684 | A1* | 4/2004 | Friedman .......... | G06F 11/3414 714/38.12 |
| 2005/0132339 | A1* | 6/2005 | Maron ............... | G06F 8/315 717/136 |
| 2006/0112399 | A1* | 5/2006 | Lessly .............. | G06F 8/38 719/318 |
| 2006/0247973 | A1* | 11/2006 | Mueller ............ | G06Q 30/0601 705/14.14 |

(Continued)

FOREIGN PATENT DOCUMENTS

KR   10-2009-0000651   1/2009

*Primary Examiner* — Shih-Wei Kraft
(74) *Attorney, Agent, or Firm* — H.C. Park & Associates, PLC

(57) ABSTRACT

A method and system for invoking an event-based package module, in which the method is executed by a computer, and includes modulating a program package in which a plurality of functions related to a specific event has been implemented into an event module using a programming language based on reflection, loading the program package corresponding to a plurality of events, analyzing the loaded program package using the reflection, and structurizing the class and function of the analyzed program package for each event.

16 Claims, 11 Drawing Sheets

(56) References Cited

U.S. PATENT DOCUMENTS

| | | | |
|---|---|---|---|
| 2007/0099683 A1* | 5/2007 | Panther Trice | G06Q 30/02 463/1 |
| 2009/0172035 A1* | 7/2009 | Lessing | G06Q 30/02 |
| 2011/0201414 A1* | 8/2011 | Barclay | G07F 17/3206 463/25 |
| 2012/0124555 A1* | 5/2012 | Bannoura | G06F 8/443 717/123 |
| 2013/0184059 A1* | 7/2013 | Costello | G07F 17/3241 463/22 |
| 2014/0245134 A1* | 8/2014 | Portnoy | G06F 9/451 715/240 |
| 2015/0072748 A1* | 3/2015 | Lyons | G07F 17/3255 463/16 |
| 2016/0217176 A1* | 7/2016 | Haviv | G06F 3/0649 |

\* cited by examiner

METHOD AND SYSTEM FOR INVOKING EVENT-BASED PACKAGE MODULE

CROSS REFERENCE TO RELATED APPLICATIONS

This application claims priority from and the benefit of Korean Patent Application No. 10-2017-0091705, filed on Jul. 19, 2017, and Korean Patent Application No. 10-2017-0091709, filed on Jul. 19, 2017, which are hereby incorporated by reference for all purposes as if fully set forth herein.

BACKGROUND

Field

Exemplary embodiments/implementations of the invention relate generally to a technology for processing an event and, more specifically, to a technology for processing an event for providing a specific service and providing the processed results in various server environments, such as games and online shopping.

Discussion of the Background

In the case of the existing various server environments, such as game servers and online shopping malls, one or more variable functions are invoked using a specific event as the start point. In most systems, an event (e.g., notice popup upon login, successive attendance points/compensation, non-ACK mail/message-related event) requested by a server is processed using a script-based programming language (i.e., script language). For example, the script-based programming language may include Lua, Java script, or Python.

If an event is processed using the script-based programming language, upon runtime, sentences included in a script file are read in one by one, and lines are delivered to a script engine (e.g., Java engine) one by one and then processed. Compared to a compiled language, the script-based programming language has a performance degradation, such that a response time for event processing is relatively delayed.

Furthermore, if the script-based programming language is used, debugging is possible up to the script engine only, but debugging within a script is difficult because the script is invoked through the script engine upon debugging. In other words, it is difficult to be aware that what is in the script file.

Additionally, in the case of the script-based programming language, code sharing between the existing code and a new code is difficult. That is, if an already implemented library is used in a server, code sharing between the existing code and a new code, such as that an external library is put into a database (DB) for compatibility with the existing code or that a new library is produced and used, is difficult.

If an event has already occurred, the processing logic of a server is processed in such a way as to modify an already produced server code and incorporate new plan (i.e., event) contents into the modified code or to incorporate updated plan (i.e., event) contents. In this case, when the new plan contents are incorporated or the updated plan contents are incorporated, the operation of the server is stopped, so the use of a user is limited. For example, a notice, such as "service use is restricted due to server check from midnight to 6 a.m. on Jul. 1, 2017", is provided to a client terminal. The client terminal undergoes restriction on service use, such as game, shopping and Internet banking, during the corresponding period.

Korean Patent Application Publication No. 10-2009-0000651 relates to an apparatus and method for providing a user interface for online game, and discloses a technology in which user interface elements are independently configured in a game engine and reused and game progress-related processing is performed based on a script.

The above information disclosed in this Background section is only for understanding of the background of the inventive concepts, and, therefore, it may contain information that does not constitute prior art.

SUMMARY

Exemplary embodiments relate to a method and system for invoking an event-based package module, wherein an event requested by a client is processed by invoking a source code in a plug-in form in a server environment in which services, such as game and online shopping, are provided using a programming language based on reflection.

Additional features of the inventive concepts will be set forth in the description which follows, and in part will be apparent from the description, or may be learned by practice of the inventive concepts.

Exemplary embodiments may provide a method of invoking an event-based package module that is executed by a computer, and may include modulating a program package in which a plurality of functions related to a specific event has been implemented into an event module using a programming language based on reflection, loading the program package corresponding to a plurality of events, analyzing the loaded program package using the reflection, and structurizing the class and function of the analyzed program package for each event.

In an exemplary embodiment, the method may further include updating the class and function of the program package structured for each event to indicate a class and function analyzed with respect to a program package corresponding to the event module loaded for update.

Exemplary embodiments may provide a system for invoking an event-based package module that includes a modularization unit configured to modulate a program package in which a plurality of functions related to a specific event has been implemented into an event module using a programming language based on reflection, an analysis unit configured to load the program package corresponding to a plurality of events and analyze the loaded program package using the reflection, and a structurization unit configured to structurize the class and function of the analyzed program package for each event.

In an exemplary embodiment, the system may further include a module update unit configured to place a lock on the invoking of an event module to be updated if the event module corresponding to the program package is to be updated and to load a program package corresponding to the event module to be updated from a module database.

Exemplary embodiments may provide a computer program stored in a recording medium in order to execute a method of invoking an event-based package module in association with a server apparatus implemented using a computer, wherein the method of invoking an event-based package module may include modulating a program package in which a plurality of functions related to a specific event has been implemented into an event module using a programming language based on reflection, loading the program package corresponding to a plurality of events, analyzing the loaded program package using the reflection, and structurizing the class and function of the analyzed program package for each event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
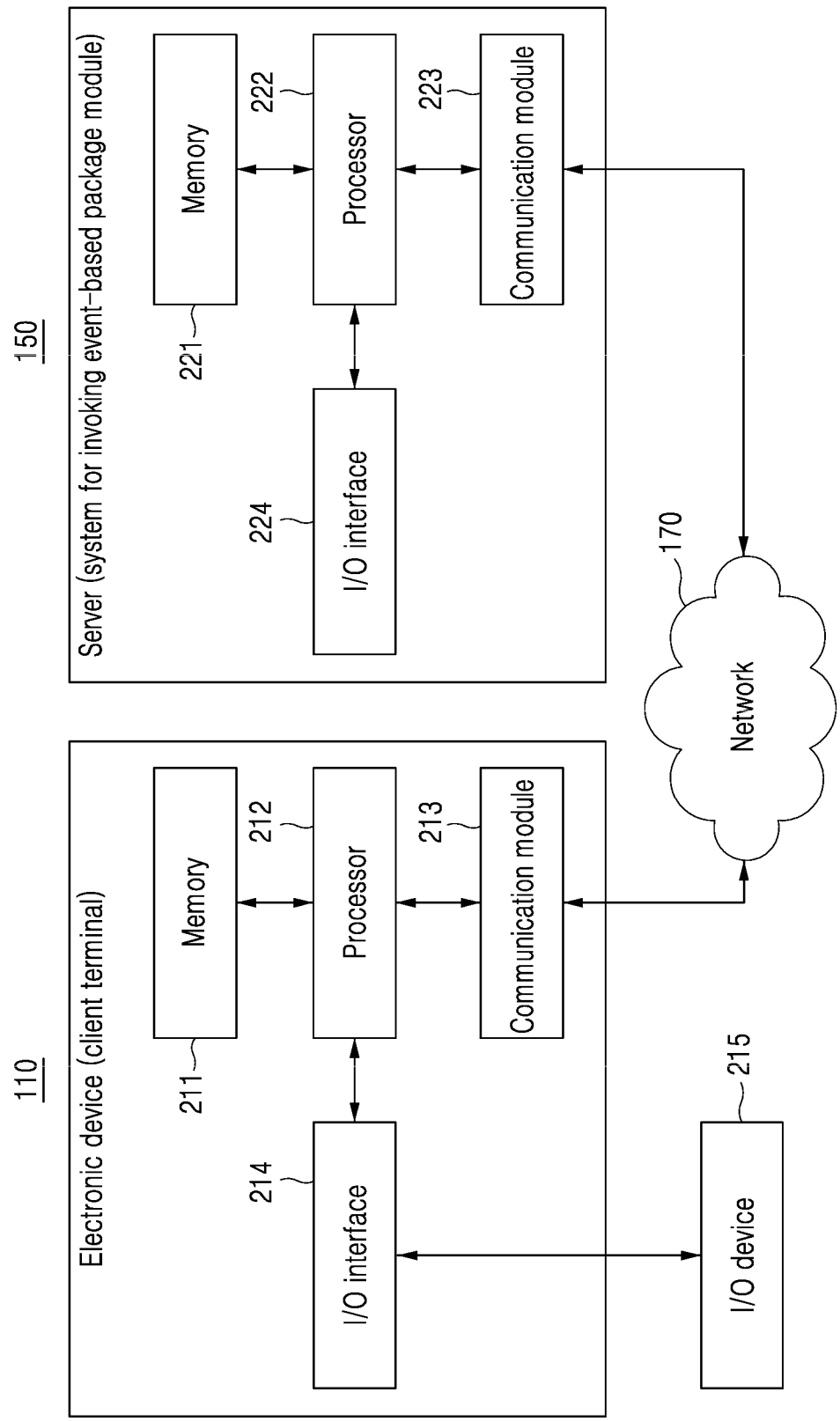
FIG. 1 is a diagram showing a network environment of a system for invoking an event-based package module in accordance with an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "connected to" or "coupled to" another element or layer, it may be directly connected to or coupled to the other element or intervening elements may be present. When, however, an element is referred to as being "directly connected to" or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, terminals, devices, and servers, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, terminals, devices, and servers, and/or one or more components thereof may include or otherwise be associated with one or more memories (not shown) including code (e.g., instructions) configured to cause the terminals, devices, and servers, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments are described in detail with reference to the accompanying drawings.

The present embodiments relate to a method and system for invoking an event-based package module and, more specifically, to a technology for processing an event using a programming language that provides reflection not a script-based programming language in various server environments, such as game servers and online shopping. For example, the programming language that provides reflection may include Java, C #, etc., and is a technology in which a file written using Java or C # and compiled is modulated and loaded onto memory, a class or function belonging to a specific event is immediately executed when invoking for the specific event is requested by a client terminal, and the results of the execution is provided to the client terminal as a response.

In the present embodiments, an "event" indicates a specific plan provided by a game server or in online shopping. For example, the event may include various types of events, such as an attendance event (e.g., an event to provide compensation/points upon successive attendance), a store event, a roulette event (e.g., an event to provide game items/compensation/points won by playing roulette upon login), a Christmas event (e.g., free use of a specific game character/game item or a Christmas gift event during the Christmas period), a friend invitation event, and a free trial event.

In the present embodiments, an "event module" is modulated from a program package including functions in which a plurality of functions related to a specific event has been implemented (i.e., functions are collected), and may be expressed as a package module. For example, one or more variable functions may be modulated using a specific event as the start point. In the case of a login event, the supply of successive attendance compensation, notice popup, etc. may belong to functions related to the corresponding event. Functions implemented to provide the corresponding functions may be collected and configured in a package form. Furthermore, a program package may be modulated for each event in order to provide a client terminal with the results of functions related to a specific event as a response, that is, so that a system itself directly executes a corresponding function through an event module and provides the results of the execution as a response without invoking a script file from a storage device, such as a database (DB), analyzing and executing the script file, and putting the script file back into the storage device, and providing the results of the execution as a response.

In the present embodiments, a "client" denotes a terminal held by a user, and may include a smartphone, a tablet, a notebook and a desktop, for example.

FIG. 1 is a diagram showing a network environment of a system for invoking an event-based package module in an exemplary embodiment of the present invention.

The network environment of FIG. 1 shows an example including an electronic device 110, a server 150 and a network 170. The electronic device 110 may indicate a client terminal, and the server 150 may indicate a system for invoking an event-based package module. FIG. 1 shows a case where the system for invoking an event-based package module has been implemented in the server 150 in a platform form, and this corresponds to an exemplary embodiment. The system for invoking an event-based package module may be positioned on the outside separately from the server 150. For example, if multiple servers are present, the system for invoking an event-based package module may form a network along with the corresponding servers and may perform processing for an event invoked by each of the servers through an event module.

The electronic device 110 is a fixed terminal or mobile terminal implemented using a computer device. The electronic device 110 may include a smartphone, a mobile phone, a navigator, a computer, a notebook, a terminal for digital broadcasting, personal digital assistants (PDA), a portable multimedia player (PMP), and a tablet PC, for example. For example, the electronic device 110 may communicate with the server 150 over the network 170 using a wireless or wired communication method.

The server 150 may be implemented using a computer device or a plurality of computer devices that provides a command, code, file, content, and services through communication with the electronic device 110 over the network 170.

Referring to FIG. 1, the system for invoking an event-based package module, that is, the server 150, and the electronic device 110 may include memory 211 and 221, processors 212 and 222, communication modules 213 and 223, and input/output (I/O) interfaces 214 and 224, respectively. An I/O device 215 may communicate with I/O interface 214 or 224. The memory 211, 221 is a computer-readable recording medium, and may include permanent mass storage devices, such as random access memory (RAM), read only memory (ROM) and a disk drive. Furthermore, the memory 211, 221 may store an operating system and at least one program code (e.g., code for a browser installed and driven in the electronic device 110 or an application for the invoking of a package module). Such software elements drive mechanism may be loaded from a computer-readable recording medium different from the memory 211, 221. The different computer-readable recording medium may include computer-readable recording media, such as a floppy drive, a disk, a tape, a DVD/CD-ROM drive, and a memory card. In another embodiment, the software elements may be loaded onto the memory 211, 221 not the computer-readable recording medium through the communication module 213, 223. For example, at least one program may be loaded onto the memory 211, 221 based on a program (e.g., the aforementioned application) installed by files provided by developers or a file distribution system (e.g., the aforementioned server 150) that distributes the installation file of an application over the network 170.

The processor 212, 222 may be configured to process instructions of a computer program by performing basic arithmetic, logic and I/O operation. The instruction may be provided from the memory 211, 221 or the communication module 213, 223 to the processor 212, 222. For example, the processor 212, 222 may be configured to execute a received instruction based on a program code stored in a recording medium, such as the memory 211, 221.

The communication module 213, 223 may provide a function through which the electronic device 110, that is, the client terminal, and the server 150, that is, the system for invoking an event-based package module, communicate with each other over the network 170. For example, a request (e.g., a request for login event invoking according to the occurrence of an event, such as login) generated by the processor 212 of the client terminal electronic device 110 based on a program code stored in a recording medium, such as the memory 211, may be transmitted to the system for invoking an event-based package module, that is, the server 150, over the network 170 under the control of the communication module 213. Inversely, a control signal or instruction, content or a file provided under the control of the processor 222 of system for invoking an event-based package module, that is, the server 150, may be received by the electronic device 110 through the communication module 213 of the electronic device 110 via the communication module 223 and the network 170. For example, a control signal and instruction of the server 150 received through the communication module 213 may be transferred to the processor 212 or the memory 211. Content or a file may be stored in a storage medium that may be further included in the electronic device 110.

The I/O interface 214, 224 may be means for an interface with the I/O device 215. For example, the input device may include a device, such as a keyboard or a mouse. Furthermore, the output device may include a device, such as a display for displaying a communication session of an application. For another example, the I/O interface 214 may be means for an interface with a device in which functions for input and output have been integrated into one, such as a touch screen. More specifically, the processor 212 of the electronic device 110 may display a service screen or content, configured using data provided by the server 150, on the display through the I/O interface 214 in processing instructions of a computer program loaded onto the memory 211.

Furthermore, in other embodiments, the electronic device 110, that is, the client terminal, and the server 150, that is, the system for invoking an event-based package module, may include more elements than the elements of FIG. 1. However, most of conventional elements do not need to be clearly shown. For example, the electronic device 110 may be implemented to include at least part of the I/O device 215 or may further include other elements, such as a transceiver, a global positioning system (GPS) module, a camera, various sensors and a database (DB). More specifically, if the electronic device 110 is a smartphone, it may be seen that the electronic device 110 may be implemented to further include various elements, such as an acceleration sensor or a gyro sensor, a camera, various physical buttons, buttons for a touch panel, an I/O port, and a vibrator for vibration.

Furthermore, the DB may be included in the server 150, that is, the system for invoking an event-based package module, or may be positioned on the outside separately from the server 150. The DB may store and manage various pieces of information for providing invoking for an event occurred in multiple electronic devices (i.e., client terminals) in which a communication session through which the server 150 accesses a website, such as game or a shopping mall, or receives a corresponding service through an application has been established, and a response to the invoked event. For example, the DB may include a module DB for storing and managing program packages corresponding to a plurality of event modules, respectively, and an attribute DB for storing and managing program packages related to the attributes (configuration items, for example, config file) of a plurality of events, respectively.

The system for invoking an event-based package module according to embodiments of the present invention may be implemented in the server 150 in a platform form. Hereinafter, an exemplary embodiment in which a communication session is set up with the server 150, an application for receiving services provided by the server 150 or a package file for installing and driving a browser is stored in the electronic device 110, and an invoked event is processed through the system for invoking an event-based package module implemented in the server 150 when the event is generated in response to a request from the electronic device 110 (i.e., when an event is generated in the electronic device and thus the server invokes an event) is described, for convenience of description.

Figure 2:
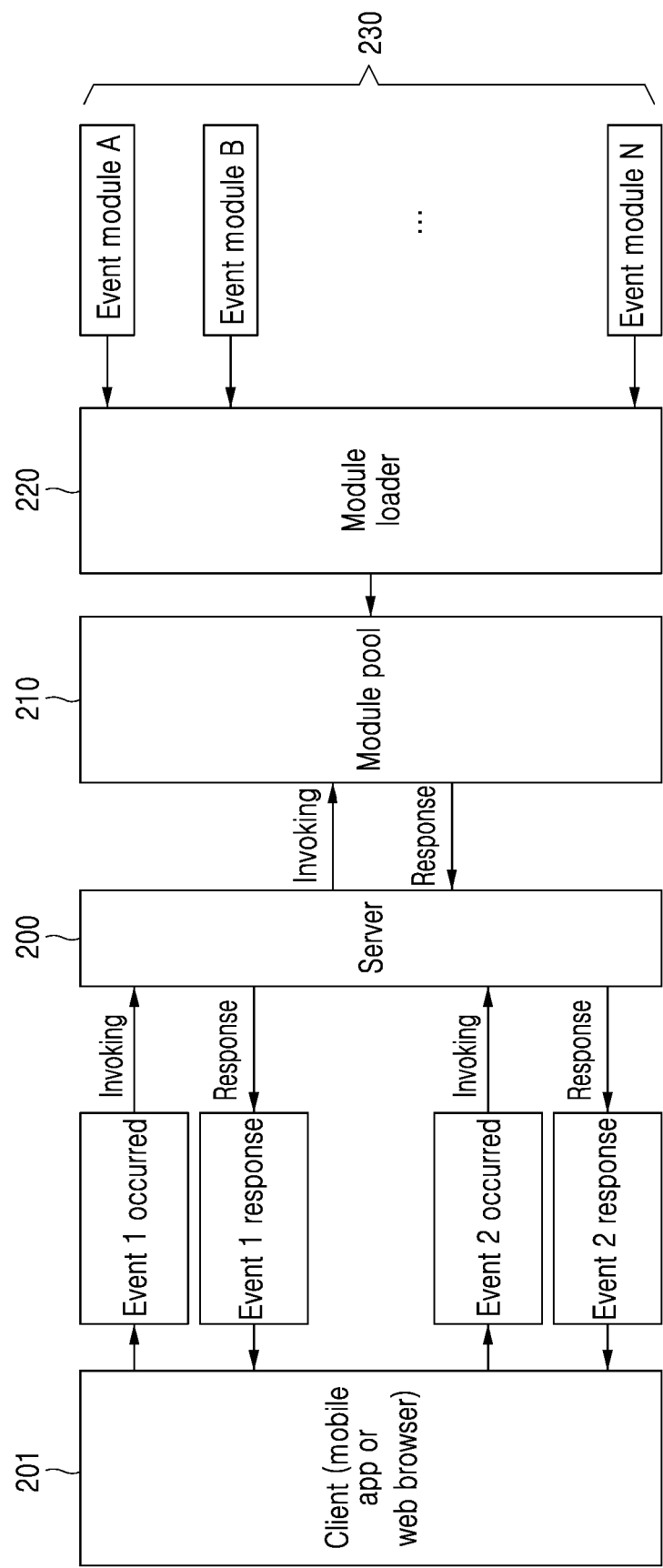
FIG. 2 is a conceptual diagram showing a network environment in which an event is processed using a programming language based on reflection in accordance with an exemplary embodiment.

FIG. 2 is a conceptual diagram showing a network environment in which an event is processed using a programming language based on reflection in an exemplary embodiment.

Referring to FIG. 2, a client 201 may indicate a mobile app or web browser installed on the electronic device 110. When a specific event (an event 1, such as login) is generated from the client 201, a server 200 may receive a request for the invoking of the generated event from the client 201 through an application or web browser installed and driven in the client 201.

The server 200 may confirm the invoked event (e.g., event 1) requested by the client 201, may search a module pool 210 for the corresponding event, may execute the event, and may transmit the results of the execution to the client 201 through an application or web browser as a response to the invoked event. That is, the server may execute a function in which functions related to the invoked event have been implemented. In this case, in order to process the event using a programming language based on reflection, the system for invoking an event-based package module, that is, the server 200, may include the module pool 210 and a module loader 220. A program package in which a plurality of functions corresponding to a plurality of events, respectively, has been collected may be modulated as the event module 230 and stored and retained in a DB (i.e., the module DB and the attribute DB). FIG. 2 shows a case where the module pool 210 and the module loader 220 are included in the server as an example, but this corresponds to an exemplary embodiment. The module pool 210 may be positioned on the outside separately from the server as memory. The module loader 220 may be implemented as a structure included in the server or the processor of an electronic device separated from the server in order to control the operation of the module pool 210.

In FIG. 2, each of event modules 230 (e.g., Event modules A-N) has been modulated from a program package (e.g., a JAR file in the case of Java and a DLL file in the case of C #) written/generated using a programming language based on reflection. The program package, such as JAR or DLL, may be implemented using a previously defined notation (e.g., Annotation in the case of JAVA and Attribute in the case of C #). In this case, the program package may include at least one function in which functions related to a specific event have been implemented. The at least one function may be defined in the program package in association with the previously defined notation (i.e., mark information). For example, a previously defined notation may be associated with a program package including functions (e.g., functions for providing results according to actions, such as admission into a webpage or a virtual space that provides an attendance event, attendance confirmation, the supply of compensation for successive attendance, and exit from a webpage or a virtual space that provides a user with an attendance event) related to an attendance event for each function corresponding to specific function and included in the program package. In this case, the notation may indicate mark information for identifying that a corresponding function has been related to a specific event. For example, @ModuleInterface may be used as the notation. Various symbols, such as # and %, may be used in addition to @. Other characters may be used in addition to "ModuleInterface."

The module loader 220 may load program packages using reflection, and may analyze a function, a variable, and class information defined in relation to a corresponding event based on a notation previously defined in the program packages with respect to the loaded program packages. In this case, as the program packages are modulated into a single event module, the module loader 220 may analyze that a loaded program package (i.e., event module) has been configured using which class, which member variable, and which member function (e.g., event function).

The module pool 210 may structurize class information, a function, and a parameter of the function for each event module corresponding to a program package analyzed by the module loader 220 using a hash function. For example, the module pool 210 corresponds to memory, and may divide and structurize the class, event function, parameter of the function of each program package loaded through the module loader for each event using a hash function. That is, if the invoking of a specific event is requested, in order to provide the client terminal with a response to the invoked specific event, data structurization for linking the class or event function of each program package to identifier information of the event may be performed. Furthermore, after a pre-processing process up to the data structurization is completed, when an invoking request for a specific event is received from the client, invoking for an event module related to the specific event received for the module pool may be requested, and a corresponding function may be executed. In this case, the invoking for the event module may be performed synchronously or asynchronously. For example, the execution code of the server may be blocked or non-blocked according to circumstances, thereby being capable of providing the flexibility of server development.

Figure 3:
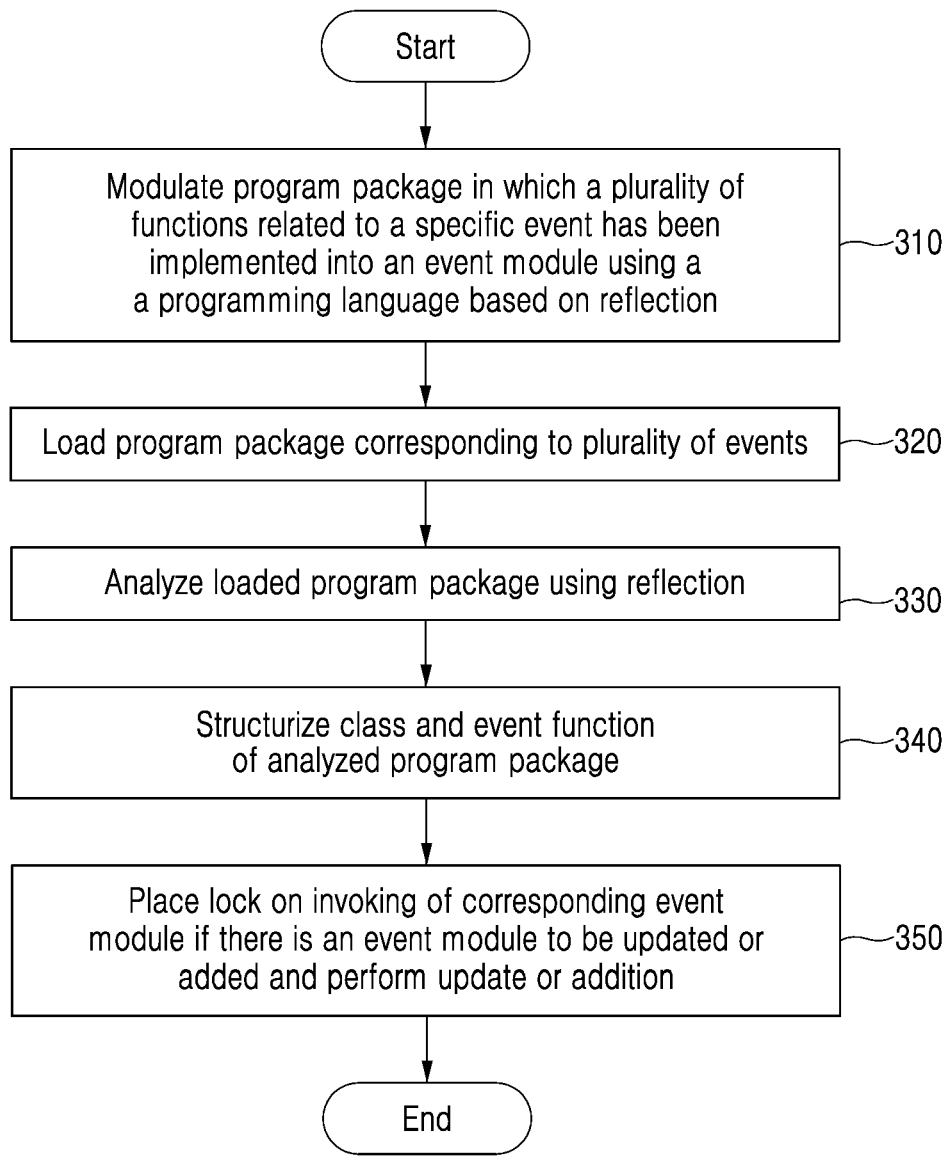
FIG. 3 is a flowchart showing a method of invoking an event-based package module in accordance with an exemplary embodiment.
Figure 4:
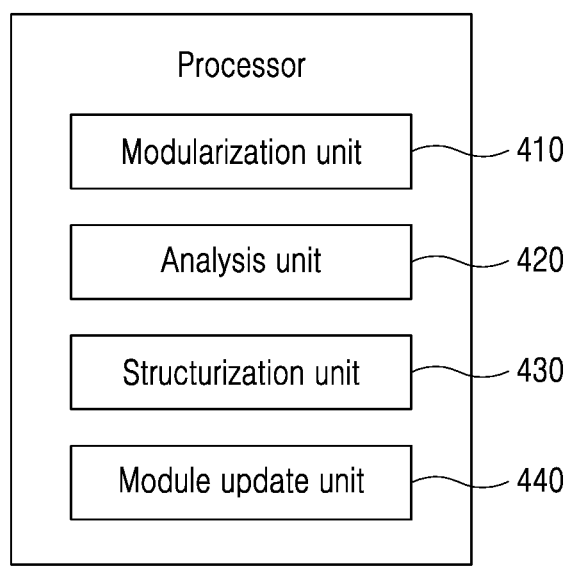
FIG. 4 is a block diagram showing an example of elements that may be included in the processor of the system for invoking an event-based package module in accordance with an exemplary embodiment.

FIG. 3 is a flowchart showing a method of invoking an event-based package module in an exemplary embodiment. FIG. 4 is a block diagram showing an example of elements that may be included in the processor of the system for invoking an event-based package module in an exemplary embodiment.

As shown in FIG. 4, the processor 400 may correspond to the processor 222 of FIG. 2 for invoking an event-based package module, and may include a modularization unit 410, an analysis unit 420, a structurization unit 430, and a module update unit 440. In FIG. 4, the analysis unit 420 may be used to execute or control an operation corresponding to the module loader 220 of FIG. 2. The structurization unit 430 may be used to execute or control an operation corresponding to the module pool 210 of FIG. 2. That is, the analysis unit 420 may perform some operations (e.g., operations of controlling the loading of program packages onto the memory and analyzing the program packages) that belong to operations of the module loader 220 and that are executed by the processor 222. The structurization unit 430 may perform some operations (e.g., operations other than operations executed by the memory and operations of searching the module pool for a function corresponding to an event whose invoking has been requested and executing the function) that belong to operations of the module pool 210 and that are executed by the processor 222.

Furthermore, the modularization unit 410, the analysis unit 420, the structurization unit 430, and the module update unit 440 may be used to perform the steps 310 to 350 of FIG. 3.

At step 310, the modularization unit 410 may modulate program packages in which a plurality of functions related to a specific event has been implemented into an event module using a programming language based on reflection. In this case, a process of modulating each of a plurality of events into an event module may correspond to a pre-processing process for modulating a program in which functions that need to be realized to provide a specific service (e.g., game service or online shopping mall service) provided by the server have been implemented into a DLL file or a JAR file and for immediately executing the DLL file or a JAR file when a corresponding event occurs. That is, the process may correspond to a pre-processing process of directly executing a DLL file or JAR file related to a corresponding event when the corresponding event occurs and providing the results of a response without fetching a corresponding script file from a DB, executing the script file, and putting the executed script file into the DB back.

For example, if the server provides a game service to the client terminal, at least one function (i.e., event function) for providing results according to actions related to a plurality of events (e.g., a login event, a logout event, a store event and an attendance event) occurring when the game service is provided may be defined in a program package. That is, a program for realizing a specific event may be defined within a function. Functions for realizing a corresponding event may be implemented in a program package for each of a plurality of events provided by the game service. For example, in the case of a store event, functions for realizing the store event may be implemented to be included in a store event package. In the case of an attendance event, functions for realizing an attendance event may be implemented to be included in an attendance event package.

In this case, in order to modulate the program package into an event module, the program package may be implemented by associating each of a plurality of functions related to a specific event with a previously defined notation. For example, an attendance event package may include the function of a function 1 and the function of a function 2 corresponding to the function 1 and function 2 related to an attendance event. Each of the function of the function 1 and the function of the function 2 may be defined in association with a notation within the program package. For example, the notation may be defined within the program package in association with a corresponding function using Annotation in the case of Java and Attribute in the case of C #.

At step 320, the analysis unit 420 may load program packages respectively corresponding to a plurality of events onto the memory. In this case, the loading operation of the analysis unit 420 may correspond to the module loader 220 of FIG. 2. That is, when the program packages respectively corresponding to the plurality of events are modulated into an event module based on the notation, the program packages may be loaded onto the memory for the analysis of the program packages.

At step 330, the analysis unit 420 may analyze each of the plurality of loaded program packages using reflection supported in a programming language in which the program packages have been implemented.

For example, the analysis unit 420 may read in a plurality of program packages using reflection supported in a programming language, such as Java or C #, and may analyze a function (i.e., event function) defined in association with a corresponding notation, the class of the corresponding function, and the parameter of the function based on a notation previously defined within the program packages with respect to the plurality of program packages.

At step 340, the structurization unit 430 may structurize the class and function (i.e., event function) of the analyzed program packages for each event.

For example, the structurization unit 430 may structurize (i.e., data structurization) the class and function of each of the analyzed program packages using a hash function so that the module pool is searched for the class or function corresponding to a specific event easily and rapidly. In this case, the structurization unit 430 may structurize (i.e., data structurization) the class and event function of each analyzed program package for each event. In addition to the class and event function, a parameter (e.g., a member variable) of the analyzed function may also be structurized using the hash function along with the class and event function. A detailed operation for the data structurization based on pieces of analyzed information (e.g., a class and an event function) is described later with reference to FIG. 5.

At step 350, if an event module to be updated or added is present, the module update unit 440 may place a lock on the invoking of the event module and perform update or addition on the corresponding event module.

For example, when an invoking request for an event to be updated or added is received from the client, the module update unit 440 may first receive the invoking request and wait for processing for the invoked event. For example, the module update unit 440 may wait for processing until the update or addition of an event module corresponding to the invoked event is completed. Furthermore, the module update unit 440 may store a program package corresponding to the event module to be updated or added in the module DB. Accordingly, for the update or addition of the event module corresponding to the program package stored in the module DB for the addition or update, the corresponding program package may be loaded onto the memory. Pieces of information structurized in relation to the corresponding program package (i.e., event module) may be updated based on a class and a function obtained by analyzing the loaded program package. For example, the class and function of an existing structurized program package corresponding to a specific event may be updated to indicate the obtained class and function.

When the update is completed as described above, the lock set for the invoking may be unlocked. In this case, a detailed operation for the update or addition of the event module is described later with reference to FIG. 7.

Figure 5:
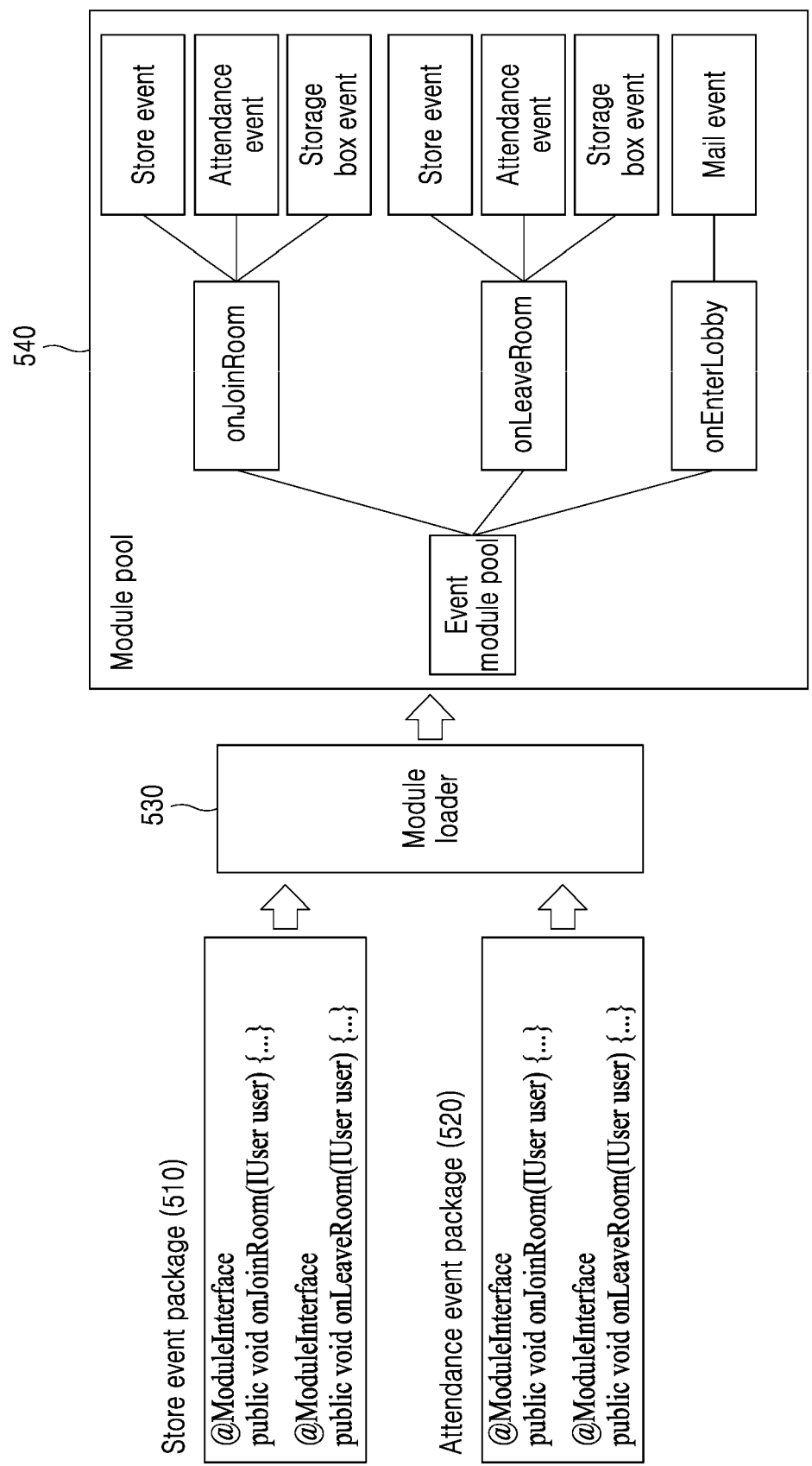
FIG. 5 is an exemplary diagram of a data structure in which pieces of information analyzed for each program package have been structured for each event in accordance with an exemplary embodiment.

FIG. 5 is an exemplary diagram of a data structure in which pieces of information analyzed for each program package have been structured for each event in an exemplary embodiment.

FIG. 5 shows an example in which when a game service is provided, if a program package related to a store event (store event package 510) and a program package related to an attendance event (attendance event package 520) are modulated into respective event modules, the corresponding program packages are analyzed and data structurization is performed. The data structure diagram of FIG. 5 corresponds to an exemplary embodiment, and data structurization may be performed in various forms. In FIG. 5, a module loader 530 may correspond to the analysis unit 420 of FIG. 4, and a module pool 540 may correspond to the structurization unit 430 of FIG. 4.

Referring to the attendance event package 520 of FIG. 5, functions (e.g., OnJoinRoom and OnLeaveRoom) for realizing functions related to an attendance event may be defined in a program package in association with a previously defined notation (@ModuleInterface). As described above, a DLL or JAR file corresponding to the attendance event package in which the notation has been defined may be modulated as an event module corresponding to the attendance event.

The module loader 530 may load a function (e.g., event function) defined by the notation (e.g., @ModuleInterface) within the package with respect to each program package. When the function is loaded, the module loader 530 may read in a class, a function and a parameter of the function using reflection.

Accordingly, the module pool 540 may structurize information (i.e., a class, a function, and a parameter of the function for each program package) loaded for fast search using a hash function. In this case, the structurization may be performed for each event based on an event function for realizing a corresponding event. For example, in the case of the event function (OnJoinRoom), the event function may be used in common in order to realize a store event, an attendance event, and a storage box event. Accordingly, the event function may be defined in a program package for each event as the notation. Accordingly, structurization may be performed so that the store event, attendance event and storage box event, that is, corresponding events, are connected to the event function (OnJoinRoom) by virtual links. That is, an operation of entering a virtual space that provides a specific event for the specific event is common to the store event, attendance event and storage box event, and an operation of leaving the virtual space is common to the store event, attendance event and storage box event after an action to suggest a corresponding event is performed. Accordingly, structurization may be performed so that the store event, attendance event and storage box event, that is, the corresponding events, are connected to event function (OnLeaveRoom) by virtual links.

Figure 6:
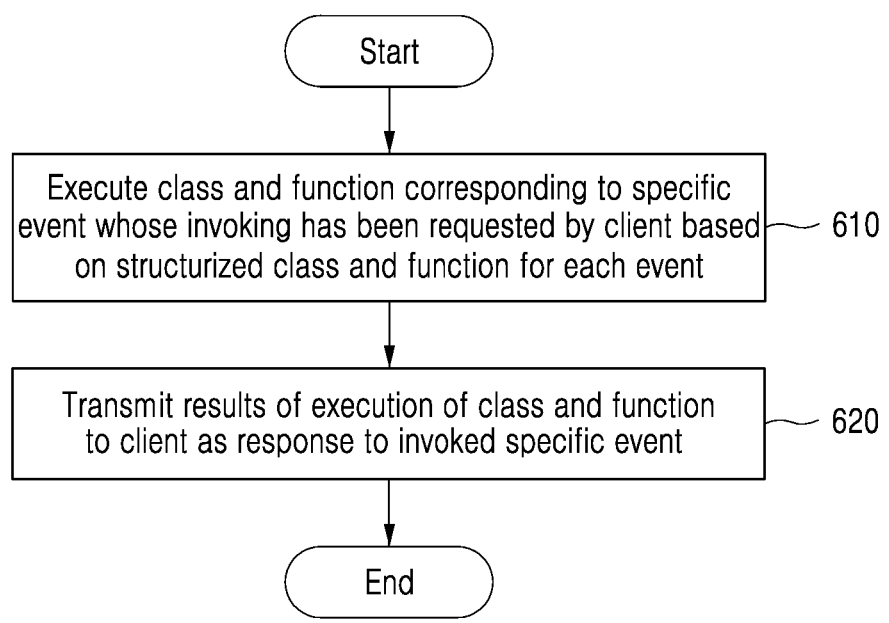
FIG. 6 is a flowchart showing an operation of providing a response to an event requested by a client after data structurization in accordance with an exemplary embodiment.

FIG. 6 is a flowchart showing an operation of providing a response to an event requested by the client after data structurization in an exemplary embodiment.

The steps 610 and 620 of FIG. 6 may be performed by the structurization unit 430 of FIG. 4.

In order to realize a plurality of events, program packages respectively corresponding to the plurality of events are modulated as event modules. After a class, a function, and a parameter of the function are structurized for each event module (i.e., for each program package), the client may generate an invoking request for a specific event. For example, in order to be supplied with compensation for successive attendance provided in an attendance event, when the client's action to enter a virtual space (e.g., clicking on an attendance event popup window or clicking on an attendance event item on a lobby screen) that provides the attendance event occurs, the system for invoking an event-based package module, that is, the server 200, may receive an invoking request for the attendance event through an application or web browser driven in the client.

At step 610, the structurization unit 430 may confirm the invoked event (i.e., confirm the invoked event based on identifier information of the event), and may search the module pool for a class and function corresponding to the confirmed event. Furthermore, the structurization unit 430 may instance the retrieved class (e.g., the class of a program package related to the attendance event) and execute a corresponding function (i.e., the function of the retrieved class). In this case, a class that has been instanced once is not directly deleted and may be maintained so that it is reused in next invoking.

For example, when an invoking request for an attendance event is generated from a client 1, the structurization unit 430 may search the module pool for a class corresponding to the attendance event, and may instance the retrieved class. In this case, identifier information of the instance generated in relation to the client 1 may be matched with identifier information of the client 1 and stored. Furthermore, if the client 1 is supplied with compensation for successive attendance in relation to the attendance event and leaves a virtual space corresponding to the attendance event, the instance generated in relation to the client 1 is not deleted and may be reused. For example, when a client 2 generates an invoking request for an attendance event, the instance generated for the client 1 may be reused. If the instance is reused as described above, the identifier information of the instance may be modified from the identifier information of the client 1 to identifier information of the client 2. In this case, the instance may be reused without being removed until the server requests the deletion of the instance. That is, the instance may be deleted when the server makes an instance deletion request.

For another example, when invoking for an attendance event occurs and the execution of a function (OnJoinRoom) is requested, the structurization unit 430 may instance a class in relation to a store event, attendance event, and storage box event corresponding to the function (OnJoinRoom) retrieved in the module pool, and may execute the function (OnJoinRoom). That is, when the client requests invoking for a store event or storage box event in addition to an attendance event, the instance of a generated class may be reused to provide a response to the invoked storage box event and store event.

At step 620, the structurization unit 430 may transmit the results of the execution of the class and function to the corresponding client as a response to the invoked specific event. In this case, if a plurality of responses is present as the results of execution of an event function of a program package (i.e., event module), the plurality of responses may be collected and transmitted to the client in the form of a single response message.

Figure 7:
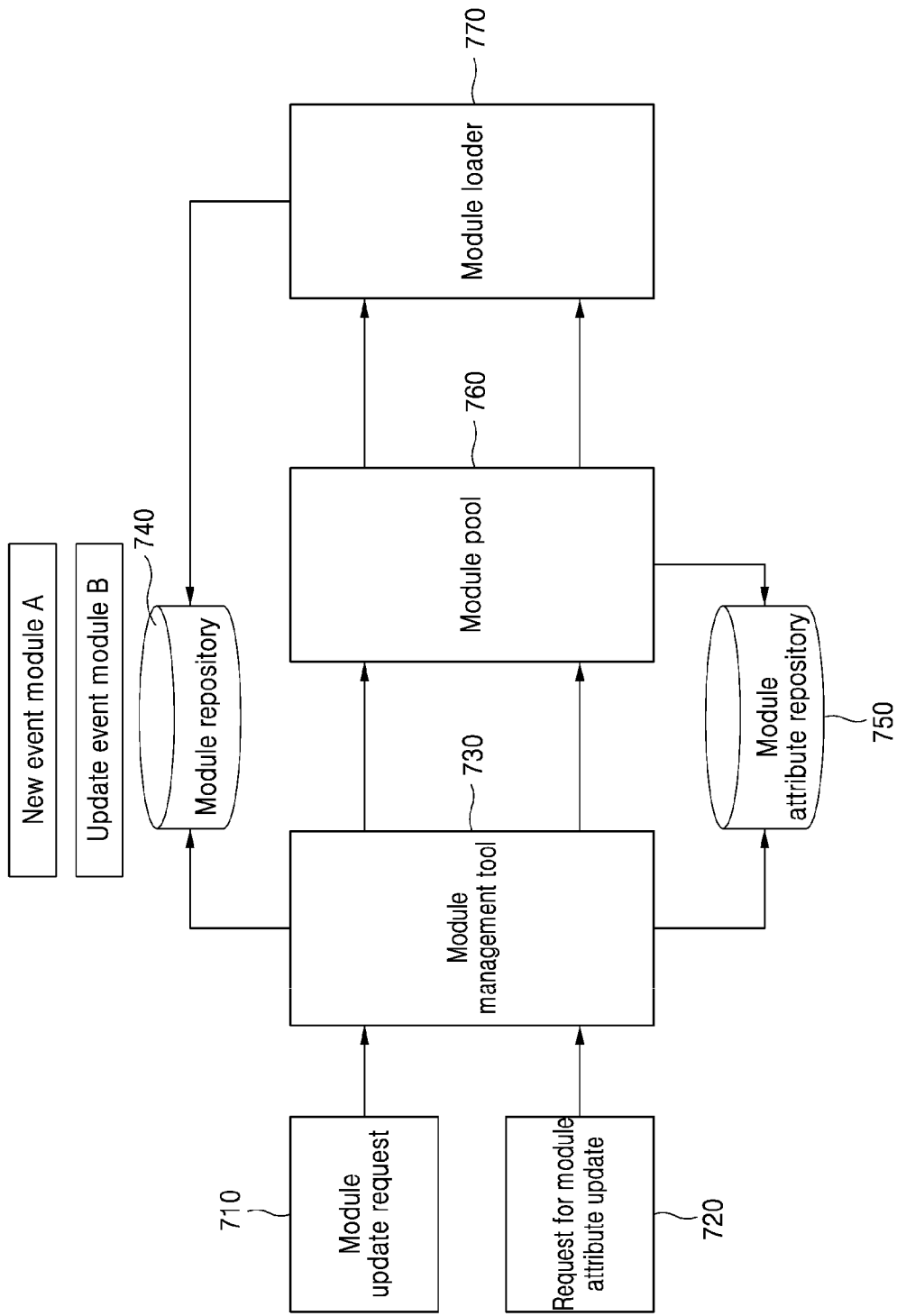
FIG. 7 is a conceptual diagram for illustrating an operation of updating or adding an event module and module attributes in accordance with an exemplary embodiment.

FIG. 7 is a conceptual diagram for illustrating an operation of updating or adding an event module and module attributes in an exemplary embodiment.

In FIG. 7, a module repository 740 may correspond to a module DB, and a module attribute repository 750 may correspond to an attribute DB. The operation of FIG. 7 may be performed by the processor 222 of FIG. 1. For example, the operation may be performed by the module update unit 440 of the processor 222.

The server (i.e., the system for invoking an event-based package module) may receive a module update request 710 through a module management tool 730. For example, mark information (e.g., a button or an icon) for the module update request 710 may be selected by an administrator of the server, so the module update request 710 may be received.

When the module update request is received as described above, the processor 222 may store a program package, corresponding to a module whose update or addition has been requested, in the module repository 740, that is, the module DB. Furthermore, the processor 222 may request the update or addition of an event module whose update or addition has been requested with respect to the module pool 760. In this case, the processor 222 may place a lock on the invoking of the event module related to a corresponding event until update or addition is completed with respect to the module pool 760 before the module pool 760 updates or adds the event module corresponding to the stored program package.

For example, if a program package related to an attendance event is modified and thus a corresponding event module is to be updated, the modified program package may be stored in the module repository 740, that is, a module DB. In this case, if the client generates an invoking request for the attendance event before the module pool is updated, the processor 222 may wait for the processing of the attendance event for a specific time until the update is completed after the invoking request for the attendance event is received. That is, access itself to a service related to the attendance event is not blocked, but the client's access to a virtual space for the attendance event is permitted and a response may be let wait temporarily because update is performed for a very short period of time. To this end, the processor 222 receives the invoking request from the client, but may place a lock on invoking for an event module related to the attendance event. Furthermore, when update related to the attendance event is completed in the module pool, the processor 222 may unlock the lock on the invoking for the event module.

For example, after the lock is set, the processor 222 may load a program package corresponding to the attendance event that is stored in the module repository 740 and whose update has been requested onto the memory. Furthermore, the processor 222 may analyze the loaded program package using reflection, and may update a class, function, and a parameter of the function related to the existing attendance event, already structurized in the module pool 760, based on the class, function, and parameter of the function obtained through the analysis. Accordingly, the update of an event module related to an attendance event whose update has been requested may be completed. When the update is completed, the processor 222 may unlock the lock on the invoking of the event module in relation to the attendance event. As described above, if an event module is to be added or updated, the server is not shut down and a module may be distributed in a nonstop state.

As in the update of an event module, the attributes (Configuration Items) of the event module may be updated. When the attributes of the event module are updated, the server is not shut down and an attribute file updated in a nonstop state may be distributed.

For example, the processor 222 may receive an update request for module attributes (720) through the module management tool 730. Accordingly, a corresponding program package may be stored in the module attribute repository 750, that is, an attribute DB. The processor 222 may place a lock on invoking for a corresponding event module in order to perform updates on the event module with respect to the module pool 760. Furthermore, when the attribute update of the requested event module is completed, the lock may be unlocked.

As described above, as event processing is performed based on the module pool 760 and the module loader 770, unlike in the existing script-based event processing method, the server can search the module pool for a corresponding event and directly execute a corresponding function without reloading a script file by transmitting a signal to the server after storing the script file in a DB (i.e., repository).

Figure 8:
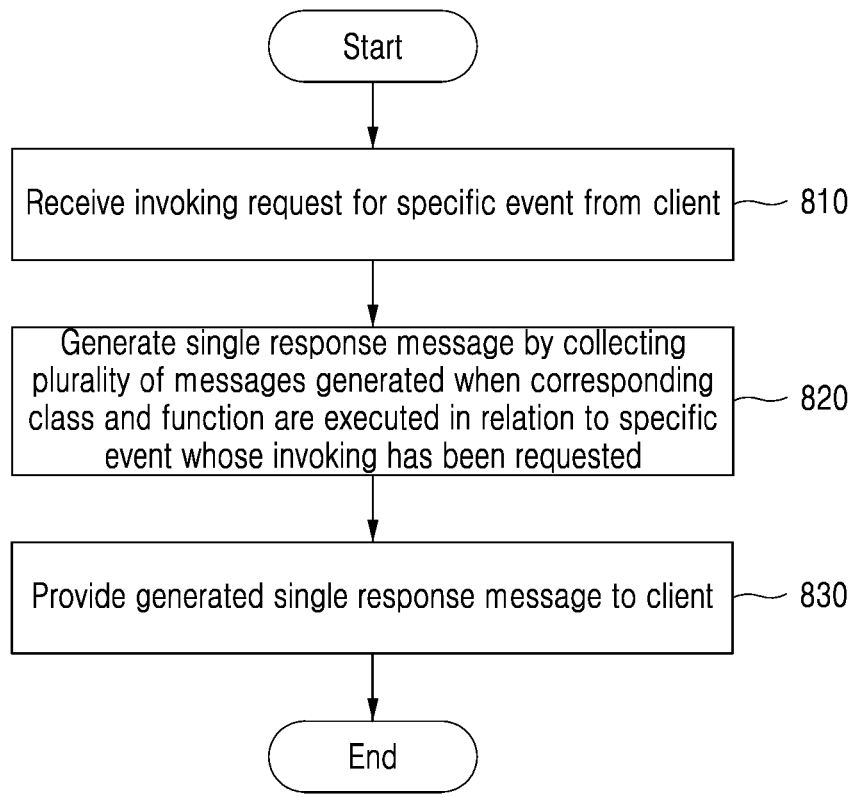
FIG. 8 is a flowchart showing an operation of providing a single response message based on an event module in accordance with an exemplary embodiment.
Figure 9:
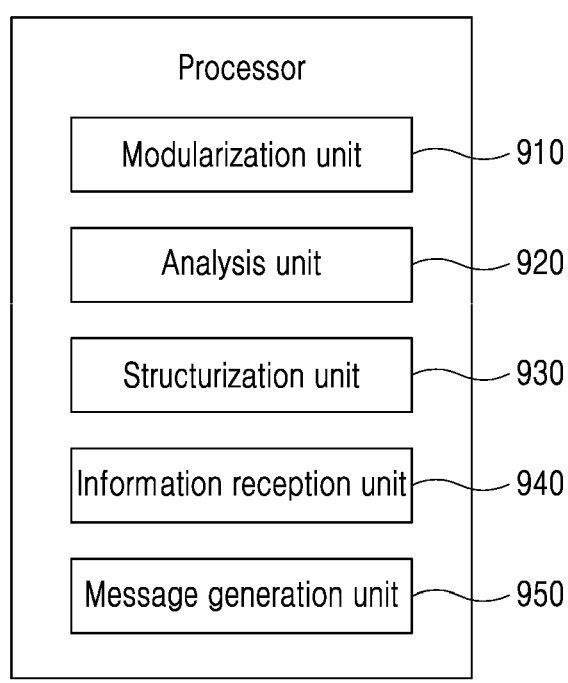
FIG. 9 is a block diagram showing the internal configuration of the processor in accordance with another exemplary embodiment.

FIG. 8 is a flowchart showing an operation of providing a single response message based on an event module in an exemplary embodiment. FIG. 9 is a block diagram showing the internal configuration of the processor in another exemplary embodiment.

In FIG. 9, the processor 900 may correspond to the processor 222 of FIG. 2, and may include an information reception unit 940 and a message generation unit 950 instead of the module update unit 440 of the processor 400 of FIG. 4.

Referring to FIG. 9, the processor 900 may include a modularization unit 910, an analysis unit 920, a structurization unit 930, the information reception unit 940 and the message generation unit 950. The operations of the modularization unit 910, the analysis unit 920 and the structurization unit 930 are the same as those of the modularization unit 410, the analysis unit 420 and the structurization unit 430 of FIG. 4, and thus a redundant description is omitted. That is, in FIG. 9, a pre-processing process (modularization and structurization through reflection-based analysis) of processing an event based on a module is the same as the pre-processing process already described with reference to FIGS. 3 and 4. The processing of a case where a response to a corresponding event is provided to the client when the client generates an event invoking request after a pre-processing process is described with reference to FIG. 9. Accordingly, the steps of FIG. 3 for the pre-processing may be performed prior to the step 810 of FIG. 8. The steps 810 to 830 of FIG. 8 may be performed by the processor 900.

At step 810, the information reception unit 940 may receive an invoking request for a specific event from the client. For example, the information reception unit 940 may receive an invoking request for an attendance event through an application installed and driven in the client.

At step 820, the message generation unit 950 may generate a single response message by collecting a plurality of messages generated based on a class and function that belong to the classes and functions of structured program packages and are related to an event module corresponding to the specific event whose invoking has been requested.

At step 830, the generated single response message may be provided to the client.

For example, the module pool may be searched for a class and function corresponding to an attendance event. The message generation unit 950 may generate a single response message by collecting response messages obtained as the results of execution as the retrieved class and function are executed. In this case, the plurality of response messages is the results of the execution of the function and is not obtained at the same time, but may be obtained at the same time or may be obtained with some time lag. Accordingly, the message generation unit 950 does not provide the client with the response messages as they come as responses to the attendance event whose invoking has been requested, but may structurize the response messages by collecting into one and provide it to the client. An operation of generating a single response message is described in detail below with reference to FIG. 10.

Figure 10:
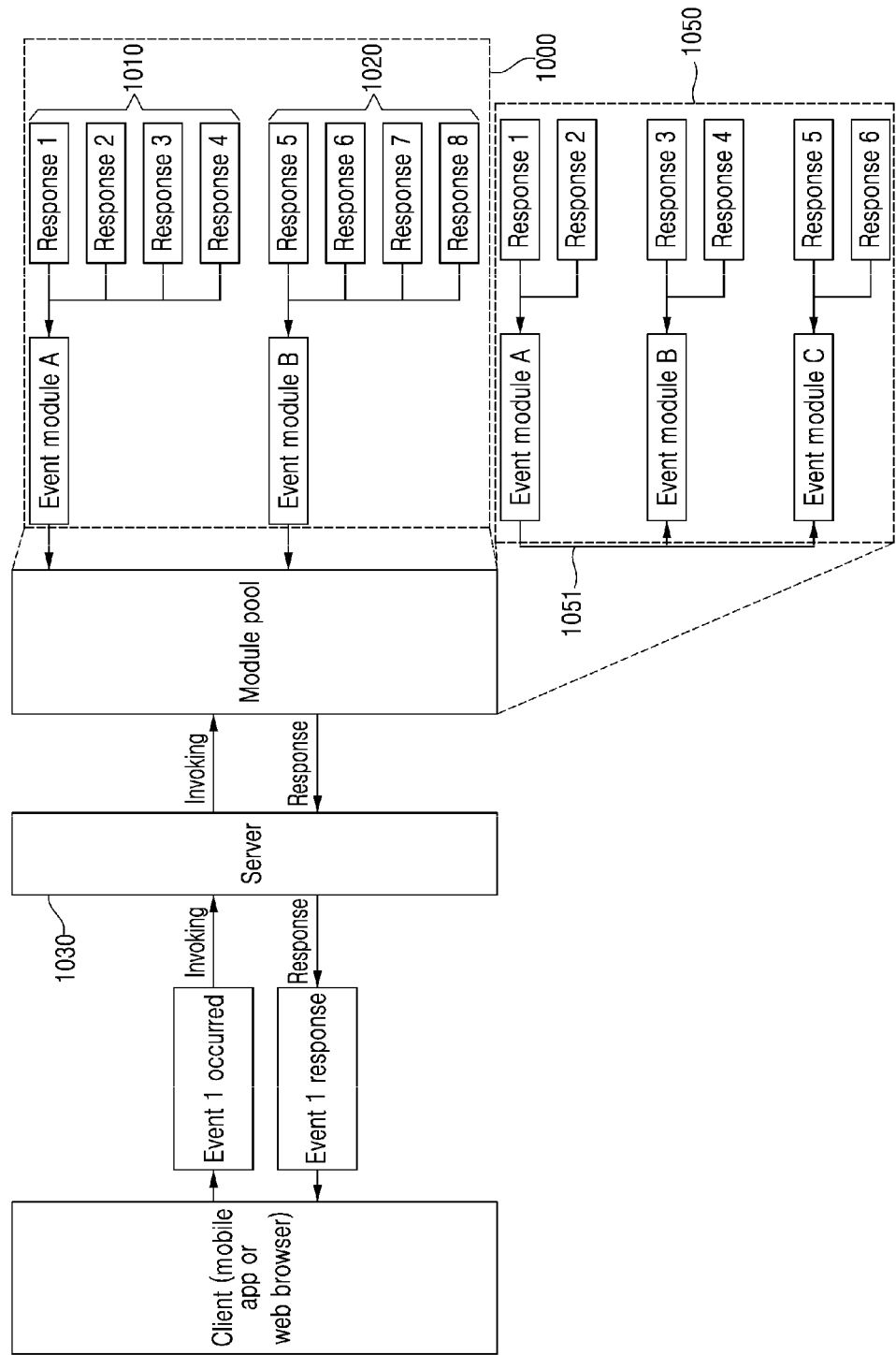
FIG. 10 is a conceptual diagram provided to describe an operation of generating a single response message in accordance with an exemplary embodiment.
Figure 11:
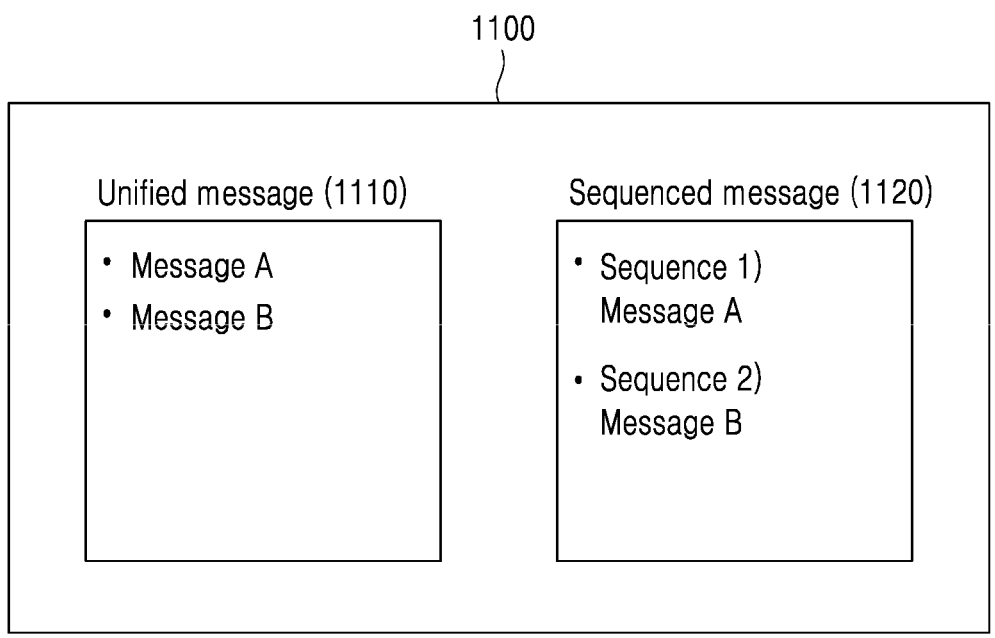
FIG. 11 is a diagram showing the format of a single response message in accordance with an exemplary embodiment.

FIG. 10 is a conceptual diagram provided to describe an operation of generating a single response message in an exemplary embodiment. FIG. 11 is a diagram showing the format of a single response message in an exemplary embodiment.

A case where a plurality of responses is collected and processed into a single response in order to obtain a performance effect by minimizing the roundtrip trip of messaging between the server and the client is described as an example with reference to FIG. 10. The case corresponds to an exemplary embodiment, and each of event modules may directly transmit a message to the client.

Referring to 1000 of FIG. 10, when an invoking request for an event 1 is received from the client, the processor 900 may invoke an event module related to the event 1 and generate a single response message from server 1030 by collecting a plurality of messages 1010 and 1020 to be transmitted, which are generated as classes and functions retrieved from the module pool are executed. Furthermore, the processor may provide the generated single response message from server 1030 to the client. That is, the processor does not immediately transmit the plurality of messages (e.g., eight response messages in FIG. 10) to the client whenever they are generated, but may temporarily store the eight response messages in a buffer, may generate a single response (i.e., a single response message), and may provide the single response to the client. In this case, after invoking for all event modules is terminated, a single response message may be generated by collecting a plurality of messages to be transmitted to the client.

For example, the processor (e.g., the message generation unit) may invoke event modules (e.g., event modules A and B) related to a specific event (e.g., event 1), may execute a corresponding class and function, and may generate a single response message by collecting a plurality of response messages 1010 and 1020 provided as the results of the execution. In this case, the messages may include a message having a sequence (i.e., sequenced message) and a message not having a sequence (i.e., unified message) according to circumstances. Accordingly, the processor (e.g., message generation unit) may generate a single response message 1100 by classifying the messages into a sequenced message 1120 and a unified message 1110 as in FIG. 11. In this case, the sequenced message 1120 may indicate a message (i.e., response message) designated to have a provision sequence when a response corresponding to the specific event requested by the client is provided.

For example, in relation to a specific event, a welcome message, an ACK message and a mail ACK message, that is, the results of execution, may be collected to generate a single response message. In relation to an authenticated client (i.e., after a user logs in), if the welcome message, the ACK message and the mail ACK message have been designed to be sequentially displayed on the display of the client, messages whose sequence has been designated may have their priority information associated with corresponding messages and configured within a single response message. For example, information indicative of priority 1, information indicative of priority 2, and information indicative of priority 3 may be included in a single response message in association with the welcome message, the ACK message, and the mail ACK message, respectively. In this case, if a unified message is present, the unified message may be together included in the single response message.

As described above, since the server provides a single response message in relation to an event whose invoking has been requested by the client, the client receives a single response message of a structurized form without a need to wait for until all of messages for structurization are received. Accordingly, the client can process all of responses to an event at once.

Referring to 1050 of FIG. 10, there may be a different event module (i.e., different program package) using a corresponding function in common while processing the function of an event module (i.e., a program package) that is processed in relation to a specific event. Accordingly, the processor 900 may reuse the function of the different event module through an internal circulation event while processing the event module, thereby being capable of preventing a redundancy code between the modules.

For example, if the number of event modules (e.g., event modules A, B and C) related to a specific event is plural, the processor 900 may invoke each of the plurality of event modules through an internal circulation event 1051 and execute a corresponding function. Furthermore, when the execution of the functions related to all the event modules (e.g., event modules A, B and C) is completed, a plurality of response messages may be generated as the results of the execution. The processor 900 may generate a single response message by collecting the plurality of response messages and provide the generated single response message to the client. In this case, if a different event module is invoked through the internal circulation event 1051, the different event module may be invoked synchronously or asynchronously and a function related to the specific event may be executed. For example, in the case of synchronous processing, the execution code of the server may be blocked. That is, a next code may wait without executing the next code until a response to the results of the execution is generated. Furthermore, when the response is generated, the next code may be executed. In the case of asynchronous processing, the execution code of the server may not be blocked. For example, a next code may be immediately executed although a response is not received. When a response is generated while the next code is executed, processing, such as that the generated response is provided to the client, may be performed.

In a server environment in which services, such as game and online shopping, are provided using a programming language based on reflection, a source code is invoked in a plug-in form, an event requested by the client is processed, and the results of the processing are provided to the client. Accordingly, a response time for a requested event can become fast. That is, performance can be improved.

Furthermore, a program package in which a function related to an event has been implemented is modulated, and an event is processed through a module pool in which modules have been structurized. Accordingly, when a new event module is added or the existing event module is updated, a corresponding module can be added or updated even without stopping the server. That is, the binary of the corresponding module can be distributed without stopping the operation state of the server.

Moreover, responses to an event requested by the client can be processed at once because multiple response messages respectively generated with respect to multiple modules are collected and generated in a single response message form and provided to the client terminal. That is, the client does not need to wait for until all responses are received in relation to an event requested by the client, does not need to wait for until it receives a message having a next sequence of a specific message after receiving the specific message, or does not need to structurize responses to a corresponding event with respect to received messages in order to provide the responses to a user. Accordingly, a response speed (i.e., processing speed) can be enhanced, and the consumption of unnecessary computing resources for processing can be prevented.

Furthermore, a developer's debugging convenience can be improved because the same programming language as an actual server code is used.

Additionally, a module code can be simplified because a function (previously generated function) already produced by the server can be easily reused in each of event modules.

The aforementioned system or apparatus may be implemented using hardware components, software components or a combination of the hardware components and the software components. For example, the apparatus and components described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may execute an operating system (OS) and one or more software applications executed on the OS. Furthermore, the processing device may access, store, manipulate, process and generate data in response to the execution of software. For convenience of understanding, a single processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configuration, such as a parallel processor, is also possible.

Software may be distributed to computer systems connected over a network and may be stored or executed in a distributed manner. Software and data may be stored in one or more computer-readable recording media.

The methods according to the exemplary embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both a machine-language code, such as code written by a compiler, and a high-level language code executable by a computer using an interpreter.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of invoking an event-based package module, the method executed by a computer comprising:
   modulating a program package in which a plurality of functions related to a specific event has been implemented into an event module using a programming language based on reflection;
   loading a plurality of program packages corresponding to a plurality of events, each event of the plurality of events being associated with a respective program package;
   analyzing the loaded program packages using the reflection; and
   structurizing a class and function of the analyzed program packages for said each event,
   wherein said each event indicates a specific plan provided by a game server, and said each event is selected from the group consisting of an event to provide game items won by playing roulette upon login, an event to provide compensation won by playing roulette upon login, an event to provide points won by playing roulette upon login, a free use of a specific game character during an event period, a free use of a specific game item during an event period, a free gift during an event period, and a friend invitation event, and
   wherein the respective program package includes at least one function for implementing the plurality of functions related to said each event, said at least one function is defined in the respective program package in association with a previously designated notation, and the previously designated notation includes information for identifying that a function of the plurality of functions corresponding the at least one function has been related to said each event,
   wherein structurizing the class and function comprises:
      executing a class or function corresponding to a specific event requested by a client based on the structurized class and function for each event; and
      transmitting results of the execution of the class or function to the client as a response to the invoked specific event, and
   wherein modulating the program package comprises modulating the program package by associating each of a plurality of functions related to the specific event with the previously designated notation.

2. The method of claim 1, wherein an event module for executing the class or function related to the specific event is invoked synchronously or asynchronously.

3. The method of claim 1, wherein structurizing the class and function comprises structurizing the class and function of the program package based on a hash function.

4. The method of claim 1, further comprising updating the class and function of the program package structured for each event to indicate a class and function analyzed with respect to a program package corresponding to the event module loaded for update.

5. The method of claim 1, further comprising updating the program package by:
   locking invocation of an event module to be updated,
   completing an update of the program package, and
   permitting invocation of the event related to the program package after the update is completed.

6. The method of claim 5, further comprising updating attributes of the event module corresponding to the program package by:
   placing a lock on invoking of an event module related to the attributes to be updated until the update of the attributes is completed.

7. A method of invoking an event-based package module, the method executed by a computer comprising:
   modulating a program package in which a plurality of functions related to a specific event has been implemented into an event module using a programming language based on reflection;
   analyzing a plurality of program packages respectively corresponding to a plurality of events using the reflection, each event of the plurality of events being associated with a respective program package;
   structurizing a class and function of each analyzed program package for each event;
   receiving a request for invoking of the specific event from a client;
   executing a function of at least one event module corresponding to the specific event whose invoking has been requested based on structurized event modules;
   generating a single response message by collecting a plurality of messages generated based on a class and function belonging to the classes and functions of the program packages and related to an event module corresponding to the invoked specific event; and
   providing the generated single response message to the client,
   wherein said each event indicates a specific plan provided by a game server, and said each event is selected from the group consisting of an event to provide game items won by playing roulette upon login, an event to provide compensation won by playing roulette upon login, an event to provide points won by playing roulette upon login, a free use of a specific game character during an event period, a free use of a specific game item during an event period, a free gift during an event period, and a friend invitation event, and
   wherein the respective program package includes at least one function for implementing the plurality of functions related to said each event, said at least one function is defined in the respective program package in association with a previously designated notation, and the previously designated notation includes information for identifying that a function of the plurality of functions corresponding the at least one function has been related to said each event, wherein modulating the program package comprises modulating the program package by associating each of a plurality of functions related to the specific event with the previously designated notation.

8. The method of claim 7, wherein generating the single response message comprises generating the single response message by classifying the plurality of messages into a unified message and a sequenced message.

9. The method of claim 8, further comprising receiving a response corresponding to the specific event whose invoking has been requested by the client; and indicating a message designated to have a provision sequence with the sequenced message.

10. The method of claim 8, wherein generating the single response message comprises generating the single response message by associating priority corresponding to each of a plurality of the sequenced messages with a corresponding message.

11. The method of claim 7, wherein generating the single response message comprises generating the single response message by collecting messages corresponding to results of the execution of the function of the at least one event module.

12. The method of claim 11, wherein executing the function comprises:

invoking each of plurality of event modules related to the specific event through an internal circulation event; and executing a corresponding function.

13. A non-transitory computer-readable medium having stored thereon computer-executable instructions configured to cause a processor to perform operations for invoking an event-based package, comprising:

instructions to modulate a program package in which a plurality of functions related to a specific event has been implemented into an event module using a programming language based on reflection;

instructions to load a plurality of program packages corresponding to a plurality of events and analyze the loaded program package using the reflection, each event of the plurality of events being associated with a respective program package; and instructions to structurize a class and function of the analyzed packages for each event, wherein said each event indicates a specific plan provided by a game server, and said each event is selected from the group consisting of an event to provide game items won by playing roulette upon login, an event to provide compensation won by playing roulette upon login, an event to provide points won by playing roulette upon login, a free use of a specific game character during an event period, a free use of a specific game item during an event period, a free gift during an event period, and a friend invitation event, and wherein the respective program package includes at least one function for implementing the plurality of functions related to said each event, said at least one function is defined in the respective program package in association with a previously designated notation, and the previously designated notation includes information for identifying that a function of the plurality of functions corresponding the at least one function has been related to said each event, wherein the instructions to structurize the class and function are configured to:

execute a class or function corresponding to a specific event requested by a client based on the structurized class and function for each event; and transmit results of the execution of the class or function to the client as a response to the invoked specific event, and wherein the instructions to modulate the program package are configured to modulate the program package by associating each of a plurality of functions related to the specific event with the previously designated notation.

14. The non-transitory computer-readable medium of claim 13, further comprising:

instructions configured to receive a request for invoking of the specific event from a client; and instructions configured to generate a single response message by collecting a plurality of messages generated based on a class and function belonging to each class and function of the program package and related to an event module corresponding to the invoked specific event and provide the generated single response message to the client.

15. The non-transitory computer-readable medium of claim 14, further comprising instructions configured to generate the single response message by classifying the plurality of messages into a unified message and a sequenced message.

16. The non-transitory computer-readable medium of claim 14, further comprising:

instructions configured to execute a function of at least one event module corresponding to the specific event whose invoking has been requested based on structurized event modules, and instructions configured to generate the single response message by collecting messages corresponding to results of execution of the function of the at least one event module.

* * * * *